US007227747B2

(12) United States Patent
Walker et al.

(10) Patent No.: US 7,227,747 B2
(45) Date of Patent: Jun. 5, 2007

(54) SECURING COMPUTER EQUIPMENT

(75) Inventors: Paul Walker, Cypress, TX (US); Earl Moore, Cypress, TX (US); Memphis Zhihong Yin, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 10/969,035

(22) Filed: Oct. 20, 2004

(65) Prior Publication Data

US 2006/0082965 A1 Apr. 20, 2006

(51) Int. Cl.
*G06F 1/16* (2006.01)

(52) U.S. Cl. .......................... 361/686; 710/303; 70/58

(58) Field of Classification Search .................... 70/58; 710/303, 304

See application file for complete search history.

(56) References Cited

U.S. PATENT DOCUMENTS

| | | | | |
|---|---|---|---|---|
| 5,117,661 | A | 6/1992 | Carl et al. | |
| D337,040 | S | 7/1993 | Carl et al. | |
| D337,041 | S | 7/1993 | Carl | |
| D346,733 | S | 5/1994 | Carl et al. | |
| 5,313,596 | A * | 5/1994 | Swindler et al. | 710/303 |
| D347,987 | S | 6/1994 | Carl et al. | |
| 5,327,752 | A | 7/1994 | Myers et al. | |
| 5,381,685 | A | 1/1995 | Carl et al. | |
| 5,450,271 | A * | 9/1995 | Fukushima et al. | 361/686 |
| 5,493,878 | A | 2/1996 | Murray, Jr. et al. | |
| 5,502,989 | A | 4/1996 | Murray, Jr. et al. | |
| 5,692,400 | A | 12/1997 | Bliven et al. | |

| | | | | |
|---|---|---|---|---|
| 5,841,631 | A | 11/1998 | Shin et al. | |
| 5,854,736 | A | 12/1998 | Fuhs et al. | |
| 5,870,281 | A * | 2/1999 | Kim | 361/681 |
| 5,870,283 | A * | 2/1999 | Maeda et al. | 361/686 |
| 5,933,322 | A | 8/1999 | Ruch et al. | |
| 5,959,835 | A * | 9/1999 | Dohi et al. | 361/686 |
| 5,995,366 | A | 11/1999 | Howell et al. | |
| 6,321,335 | B1 * | 11/2001 | Chu | 726/28 |
| 6,331,934 | B1 * | 12/2001 | Helot et al. | 361/686 |
| 6,565,163 | B2 * | 5/2003 | Behl et al. | 312/223.1 |
| 6,570,758 | B1 * | 5/2003 | Maeda | 361/686 |
| 6,697,252 | B2 | 2/2004 | Maeda | |
| 6,741,462 | B2 * | 5/2004 | Kamphuis et al. | 361/686 |
| 6,744,627 | B2 | 6/2004 | Won et al. | |
| 6,745,330 | B1 | 6/2004 | Maillot | |
| 6,758,069 | B2 * | 7/2004 | Derman | 70/58 |
| 7,079,385 | B1 * | 7/2006 | Cheng et al. | 361/686 |
| 2004/0177658 | A1 * | 9/2004 | Mitchell | 70/58 |
| 2006/0066438 | A1 * | 3/2006 | Altounian et al. | 340/5.53 |

* cited by examiner

*Primary Examiner*—Lisa Lea-Edmonds

(57) ABSTRACT

Embodiments of the present invention secure docking stations, notebook computers and removable devices. In one embodiment, a docking station is provided. The docking station includes a base unit for engaging a computer and a lock including a lock mechanism, a key receptacle exposed in an opening on a side of the base unit, and a t-bar extending from the lock mechanism. The docking station also includes an ejection mechanism on the base unit, a lever arm having a first surface for engaging the t-bar of the lock, the lever arm rotating when the t-bar moves between a locked position and an unlocked position, and a sliding member, responsive to movement of the lever arm, that slides into a position to interfere with the ejection mechanism when the lock is in a locked position such that the ejection mechanism is disabled from releasing the computer from the base unit.

23 Claims, 17 Drawing Sheets

SECURING COMPUTER EQUIPMENT

BACKGROUND

Notebook computers have gained in popularity as manufacturers have produced products that offer a high degree of portability and processing power. Many computer manufacturers have also developed docking stations for their notebook computer offerings. These docking stations enable easy connection for the notebook computers to networks, monitors, and other peripheral devices to harness the processing power of the notebook computer in a static, office environment.

Unfortunately, the portability of notebook computers increases the risk of theft as compared with larger, desk-top systems. A higher risk of theft also exists for the docking stations as such devices are typically small compared to the traditional desk-top computer.

Many systems for securing notebook computers have been developed to address this risk. One common form of security for notebook computers is the use of a so-called "T-bar" lock. The T-bar lock typically includes a main body that houses a locking mechanism. At one end, the body includes a key receptacle for activating the locking mechanism. At the other end, the body includes a T-bar that is inserted into a slot on the side of a notebook computer. The main body is secured to a large object, e.g., a desk, by means of a cable, chain or other mechanism.

Some systems have been designed to enable a single lock to secure both a docking station and a notebook computer. Further, some systems secure the notebook, docking station and peripheral devices with a single lock. However, these systems typically suffer from a common defect: the lock mechanism is cumbersome to use and functions differently depending on the physical location of the lock mechanism. Thus, by applying the locking mechanism in the wrong location, the user may not fully secure the entire system as desired.

SUMMARY

Embodiments of the present invention provide a simple, elegant solution to secure notebook computers, docking stations and removable devices against theft. In one embodiment, a docking station is provided. The docking station includes a base unit for engaging a computer and a lock including a lock mechanism, a key receptacle exposed in an opening on a side of the base unit, and a t-bar extending from the lock mechanism. The docking station also includes an ejection mechanism on the base unit, a lever arm having a first surface for engaging the t-bar of the lock, the lever arm rotating when the t-bar moves between a locked position and an unlocked position, and a sliding member, responsive to movement of the lever arm, that slides into a position to interfere with the ejection mechanism when the lock is in a locked position such that the ejection mechanism is disabled from releasing the computer from the base unit.

In one embodiment, a docking station is provided. The docking station includes a base unit for engaging a computer. The docking station also includes a lock, secured in the base unit, the lock including a body housing a lock mechanism, a key receptacle exposed in an opening on a side of the base unit, and a t-bar extending from the body. The docking station further includes an ejection mechanism on the base unit and an eject member responsive to the ejection mechanism to release the computer from the base unit. The docking station further includes a lever arm having a first surface for engaging the t-bar of the lock, the lever arm rotating when the t-bar moves between a locked position and an unlocked position. The docking station also includes a sliding member, responsive to movement of the lever arm, that slides into a position to interfere with the eject member when the lock is in a locked position such that the ejection mechanism is disabled from releasing the computer from the base unit.

In one embodiment, a docking station is provided. The docking station includes a base unit for engaging a computer and a lock, secured in the base unit, the lock including a body housing a lock mechanism, a key receptacle exposed in an opening on a side of the base unit, and a t-bar extending from the body. The docking station also includes a slot in the base unit for receiving a removable device. The docking station also includes an ejection mechanism, associated with the slot, to release the removable device when the second ejection mechanism is activated. The docking station further includes a lever arm having a first surface for engaging the t-bar of the lock, the lever arm rotating when the t-bar moves between a locked position and an unlocked position and a lock arm, responsive to the movement of the lever arm, the lock arm including an interfering surface that rotates to a position to interfere with the ejection mechanism when the lock is in a locked position such that the second ejection mechanism is disabled from releasing the removable device.

DETAILED DESCRIPTION

Embodiments of the present invention secure computer equipment against theft. Section I of the present specification describes two embodiments of docking stations incorporating a security mechanism according to the teachings of the present invention. Section II describes one embodiment of a lock used in embodiments of the present invention. Sections III and IV describe embodiments of internal mechanisms for securing a notebook computer to a docking station and for securing removable devices in a docking station, respectively. Finally, Section V describes an embodiment of a technique for installing a lock in a docking station according to the teachings of the present invention.

I. Embodiments of a Docking Station with a Security Mechanism

Figure 1:
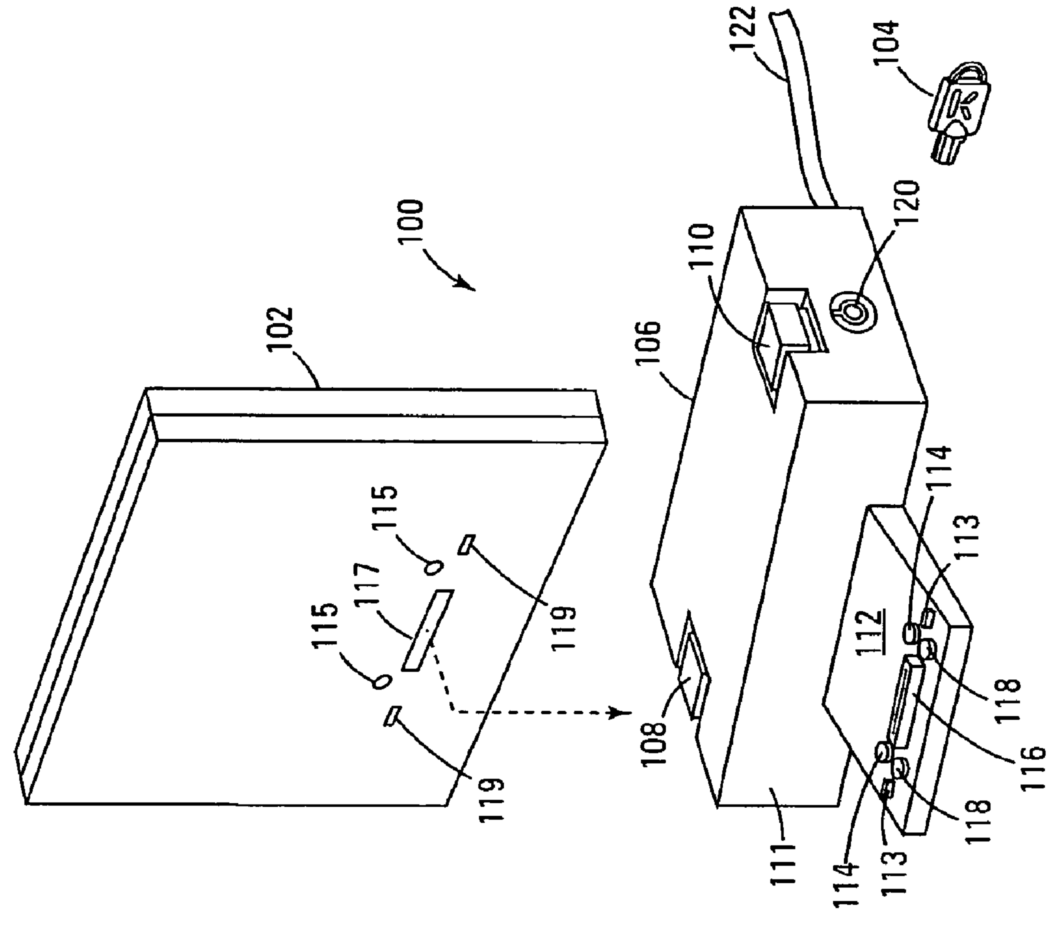
FIG. 1 is a perspective view of one embodiment of a docking station with a mechanism for securing a notebook computer and the docking station with a common lock mechanism.

FIG. 1 is a perspective view of a docking station, indicated generally at 100, with a mechanism for securing a notebook computer 102 and the docking station 100 with a common lock. In one embodiment, the docking station 100 includes a base unit 106. The base unit 106 includes power button 108 and ejection button 110. Power button 108 controls the application of power to notebook computer 102 when connected to docking station 100. Ejection button 110 is an ejection button. When pressed, ejection button 110 activates an ejection mechanism, housed within docking station 100, which ejects notebook computer 102 from docking station 100.

Docking station 100 includes an interface with notebook computer 102 that enables notebook computer 102 to be electrically connected to docking station 100 and also enables notebook computer 102 to be ejected from docking station 100. In one embodiment, docking station 100 includes an angled platform 112 that extends from a front surface 111 of docking station 100. When connected to docking station 100, notebook computer 102 rests on angled platform 112. In one embodiment, angled platform 112 includes a docking connector 16, docking posts 114, and latching members 113 that are adapted to enable notebook computer 102 to make proper electrical and physical connection with docking station 100. Docking posts 114 align with openings 115 in a bottom surface of notebook computer 102. Latching members 113 further engage other openings 119 in the bottom of notebook computer 102. Further, docking connector 116 couples to a corresponding connector 117 on the bottom of notebook computer 102 to provide electrical connection for passing signals between the docking station 100 and the notebook computer 102.

In one embodiment, the ejection mechanism of docking station 100 is located in the base unit 106. The ejection mechanism interfaces with notebook computer 102 through ejection posts 118 and latching members 113. When ejection button 110 is pressed, ejection posts 118 are activated to push on the bottom surface of notebook computer 102. Further, latching members 113 are moved to enable ejection posts 118 to lift notebook computer 102 and disconnect notebook computer 102 from docking connector 116.

Specific embodiments for interfacing between notebook computer 102 and docking station 100 have been described, e.g., angled platform 112, docking connector 116, latching members 113, ejection posts 118, etc. It is understood that these embodiments have been shown by way of illustration and not by way of limitation. In other embodiments, docking station 100 takes on other forms that enable connection and ejection of a notebook computer.

Docking station 100 includes a security mechanism that prevents ejection of notebook computer 102 from docking station 100 when the security mechanism is in a locked position or state. In one embodiment, the security mechanism is operated by a key 104 to secure the docking station 100 and the notebook computer 102. In this embodiment, a key receptacle 120 of an internal locking mechanism is located beneath the ejection button 10. In other embodiments, the key receptacle 120 is located at any other appropriate location on the exterior of docking station 100. When the key 104 is inserted in the key receptacle 120 and turned to a locked position, the ejection button 110 is locked in place and cannot be pushed to eject notebook computer 102. This prevents notebook computer 102 from being properly ejected from docking station 100. The docking station 100 also includes a cable 122, coupled to the locking mechanism, which extends from a rear portion of the base unit 106. The docking station 100 is secured to an object such as a desk, etc. using the cable 122.

Figure 2:
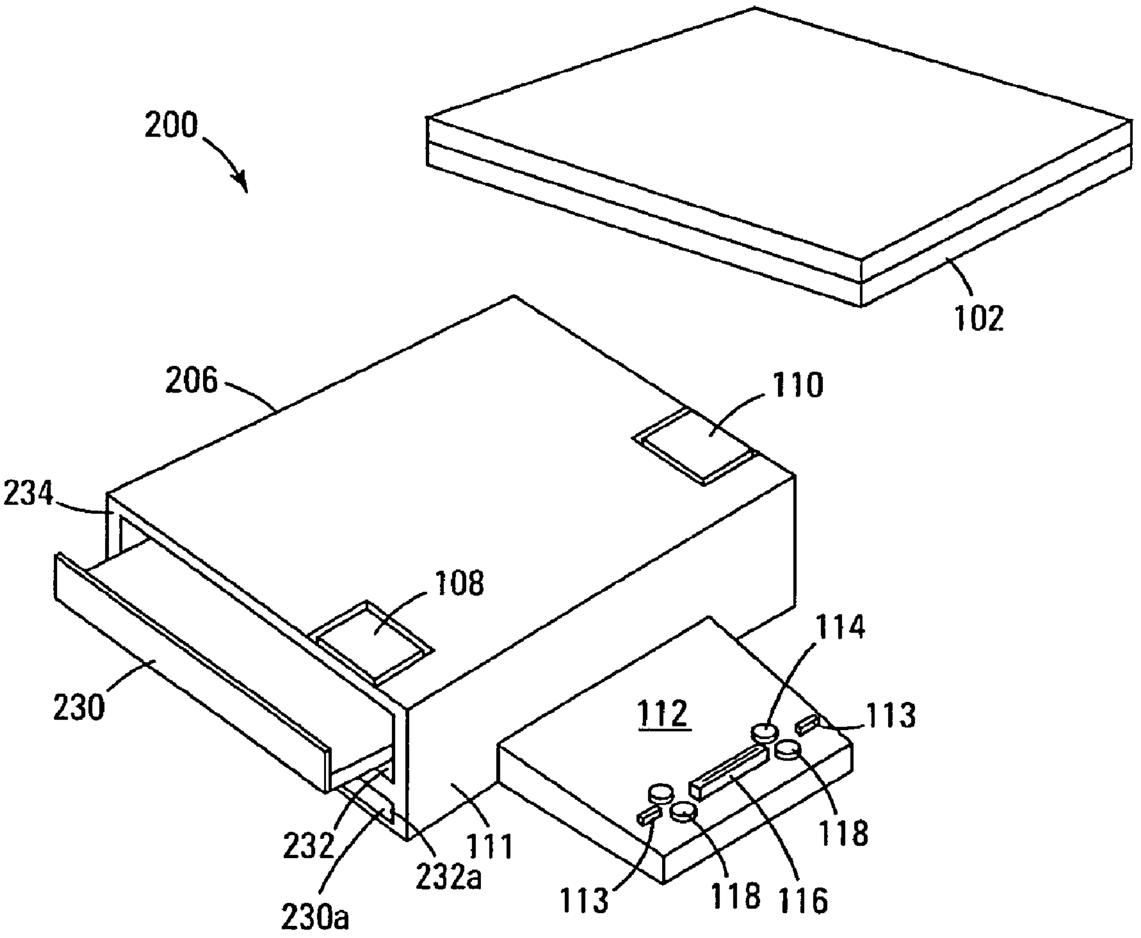
FIG. 2 is a perspective view of another embodiment of a docking station with a mechanism for securing a notebook computer, the docking station and one or more removable devices using a common lock mechanism.

FIG. 2 is a perspective view of another embodiment of a docking station, indicated generally at 200. Docking station 200 is similar to docking station 100 of FIG. 1. Thus, the description of docking station 200 uses similar numbers to represent similar components to docking station 100. These common components are not described again here.

Docking station 200 adds a mechanism for securing one or more removable devices in docking station 200 using the same key and lock used to secure the notebook computer 102 and the docking station 200. Docking station 200 includes a modified main body 206 that includes slots 232 and 232*a* on side 234 of main body 206. In this embodiment, the slots are shown, by way of example and not by way of limitation, as being located on the left side of the docking station 200. In other embodiments, slots are located on any appropriate side of docking station 200. Further, docking station 200, in other embodiments, includes any appropriate number of slots.

Slots 232 and 232*a* are adapted to receive removable devices. In this embodiment, slot 232 is adapted to receive a removable drive 230. In one embodiment, removable drive 230 comprises one or more of a hard drive, compact disc (CD) drive, CD-RW drive, digital versatile disc (DVD) drive, DVD+RW/R drive, CD/DVD combination drive or any other appropriate optical, magnetic or other data storage device. Similarly, slot 232*a* is adapted to receive removable cards 230*a* such as a personal computer memory card international association (PCMCIA) type cards. In one embodiment, slot 232*a* is adapted to receive cards compatible with the ExpressCard standard. In other embodiments, the slots in docking station 200 are sized to receive any other appropriate type of removable device.

In one embodiment, removable drive 230 and removable card 230*a* are held in place within main body 206 of docking station 200 using a latching mechanism (not shown) inside main body 206. The latching mechanism is disengaged and the removable drive 230 or removable card 230*a* is released when the respective drive or card is pushed in toward the center of main body 206.

Docking station 200 includes a security feature that locks out disengagement of the latching mechanism when the docking station 200 is locked. In one embodiment, locking the docking station 200 prevents disengagement of the locking mechanism by preventing inward movement of the drive 230 or card 230*a*.

II. Lock for Docking Station

Figure 3:
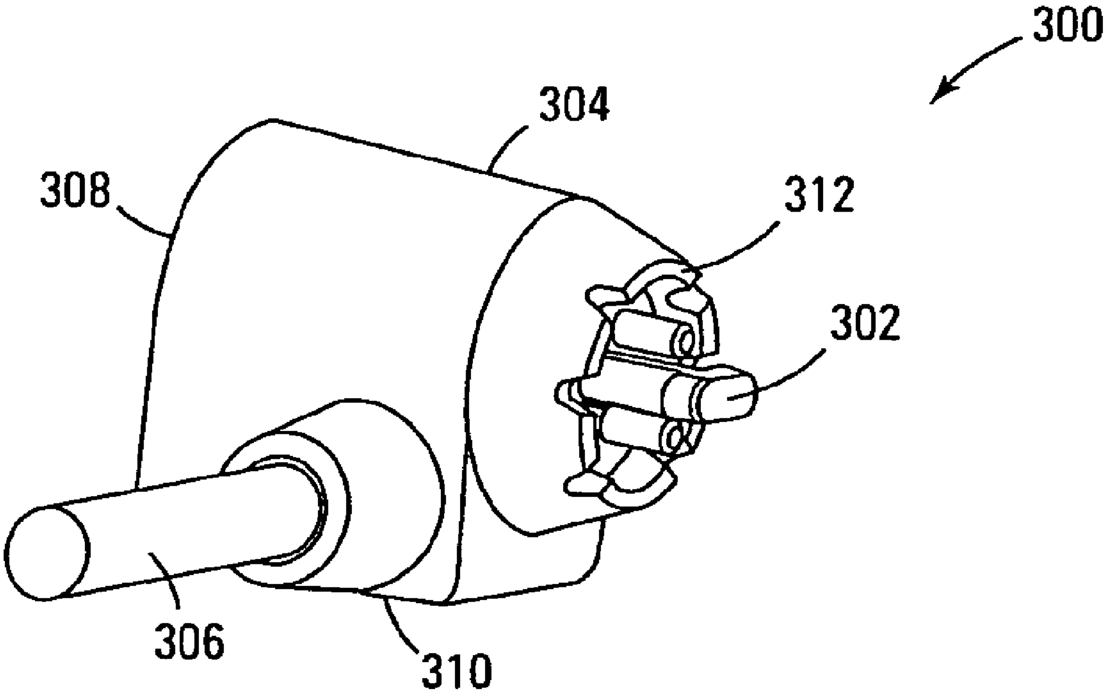
FIG. 3 is a perspective view of an embodiment of a t-bar lock mechanism.
Figure 4:
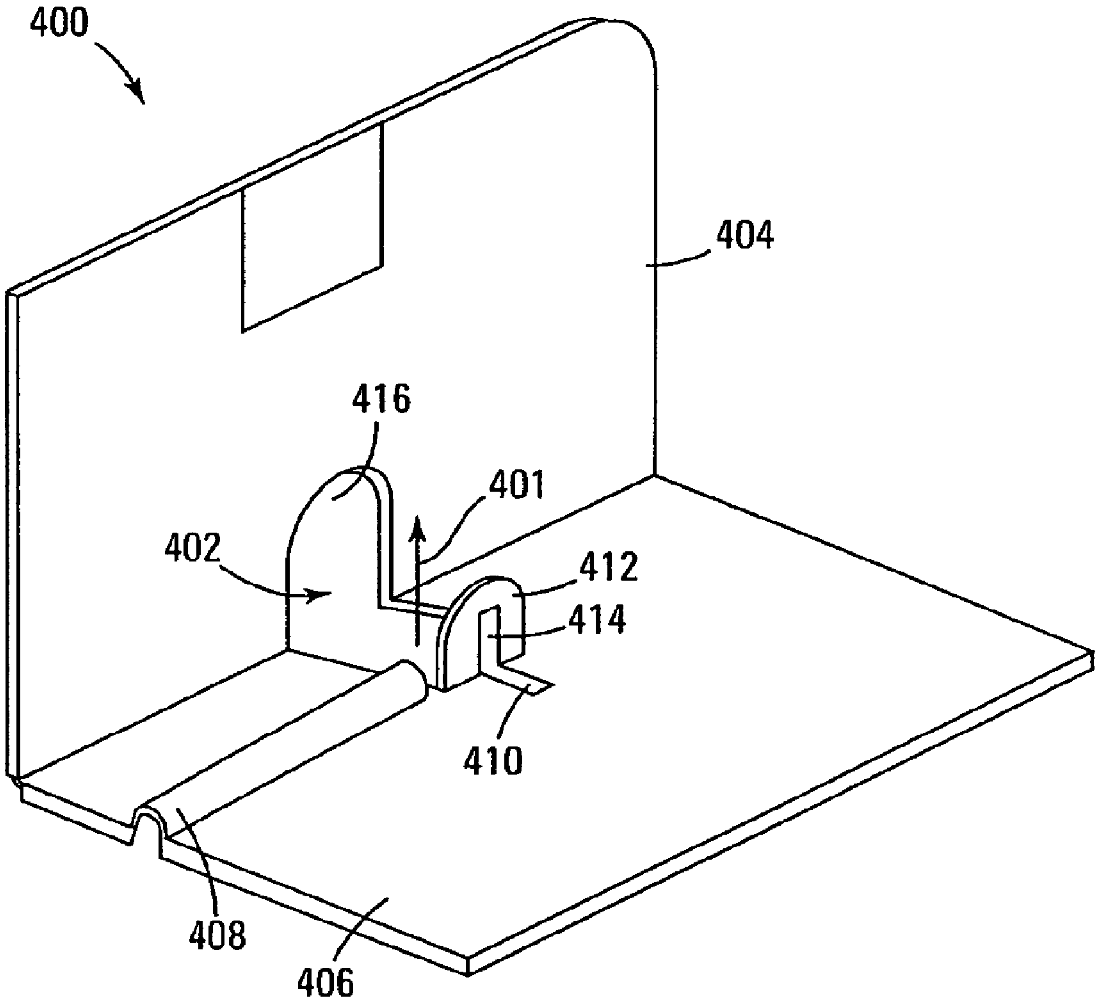
FIG. 4 is a perspective view of a portion of an interior of an embodiment of a docking station with an opening for receiving a lock mechanism.

FIGS. 3 and 4 illustrate an embodiment of a lock 300 and a portion of an embodiment of a docking station 400 that uses the lock 300 to secure a notebook computer and/or removable devices, and a docking station. The lock 300 and docking station 400 are described together below.

Lock 300 provides two types of security for docking station 400. Lock 300 actuates a mechanism that secures a notebook computer and/or a removable device to docking station 400. Lock 300 also secures docking station 400 to a stationary object, e.g., a desk.

Lock 300 actuates the security mechanism of docking station 400 with a t-bar 302 that extends from a main body 304 of lock 300. Main body 304 houses a locking mechanism. The locking mechanism changes between locked and unlocked states or positions using a key, e.g., key 104 of FIG. 1. When the lock 300 transitions between locked and unlocked states, the t-bar 302 rotates thus actuating the mechanism that secures the notebook computer and/or the removable device. Lock 300 also includes ridges 312 surrounding t-bar 302 to hold main body 304 stationary when the locking mechanism rotates between locked and unlocked states.

Lock 300 secures docking station 400 to a stationary object. Lock 300 includes a cable 306 that extends from main body 304. Cable 306 is adapted to be securely attached to the stationary object as is known in the art.

As seen in FIG. 4, docking station 400 includes an opening 402 for receiving lock 300. For sake of clarity, only a portion of docking station 400 is shown in FIG. 4. Docking station 400 includes a side 404 and a bottom 406. The main body 304 of the lock 300 is inserted in opening 402 in the direction of arrow 401 with a key receptacle exposed in opening 402 in side 404. Main body 304 of lock 300 fits between side 404 and wall 412. T-bar 302 extends through slot 414 and beyond wall 412. Cable 306 rests in channel 408 formed in bottom 406 of docking station 400.

In one embodiment, opening 402 forms an arc 416 along the surface of side 404 that is of the same general shape as end 308 of main body 304 of lock 300. Similarly, the portion of opening 402 in bottom 406 has the same general, rectangular shape and size of the bottom 310 of lock 300. Bottom 406 of docking station 400 also includes a slot 410 for receiving the end of the t-bar 302 when the main body 304 passes through opening 402.

In one embodiment, lock 300 is installed in docking station 400 as an optional upgrade by an end user. Installation of the lock 300 is enabled by formation of opening 402 and slot 410 in bottom 406 of docking station 400. One technique for installing a lock in a docking station is described below with respect to FIGS. 16–19.

III. Securing a Notebook Computer to a Docking Station

FIGS. 5–10 illustrate one embodiment of an internal mechanism for a docking station that inhibits operation of an ejection mechanism for ejecting a notebook computer when a security device is locked. Each of FIGS. 5–10 is described in turn below. For convenience in describing this embodiment, common components between the various figures are illustrated with the same reference numerals.

Figure 5:
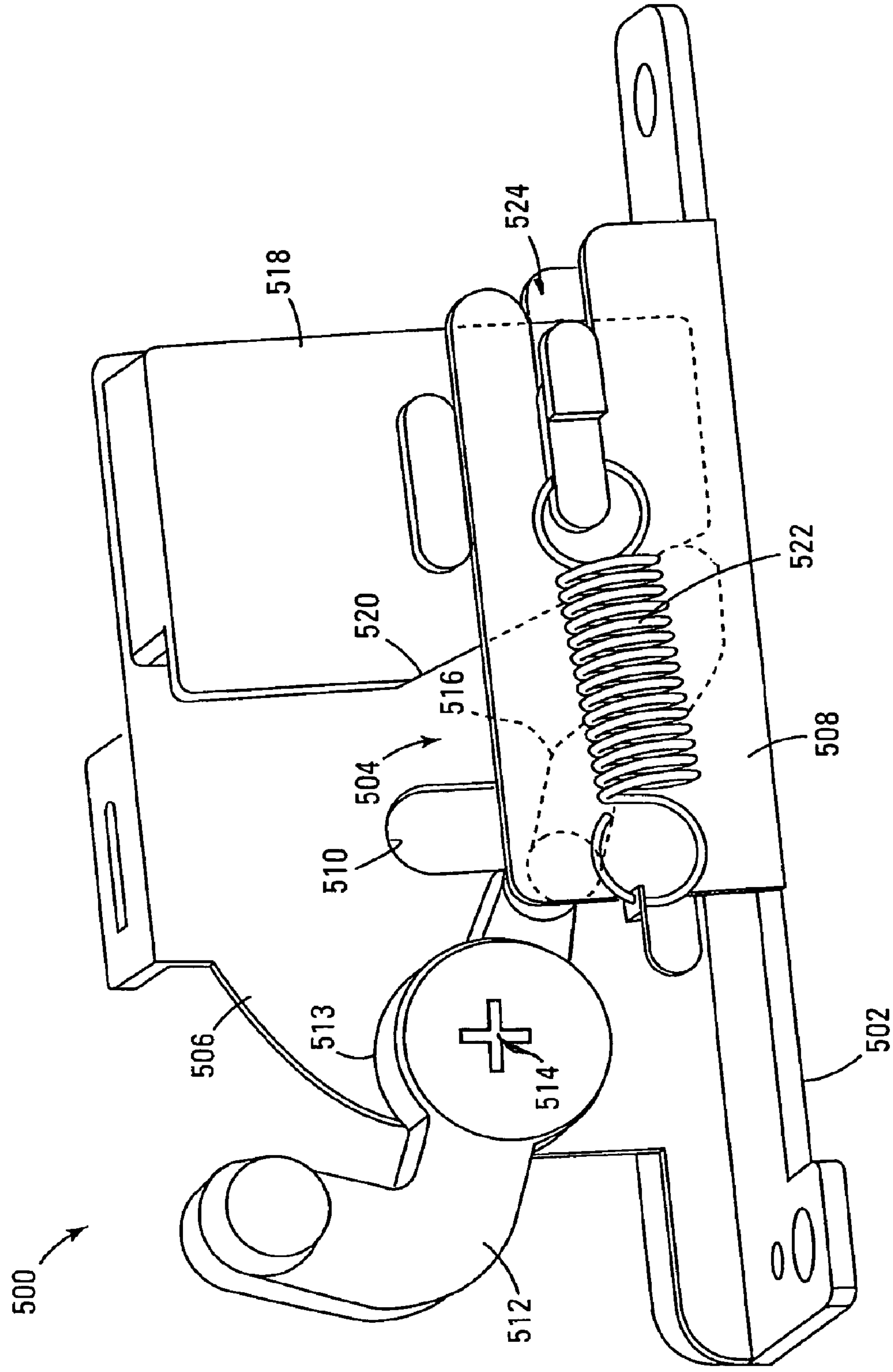
FIG. 5 is a perspective view of a portion of an embodiment of a security mechanism for preventing the ejection of a notebook computer from a docking station.

FIG. 5 is a perspective view of a portion of an embodiment of a security mechanism 500 for preventing the ejection or removal of a notebook computer from a docking station. Mechanism 500 is formed on a bracket 502. Bracket 502 includes a channel 504 between sides 506 and 508. Side 506 includes a slot 510 that is sized to receive a t-bar of a lock such that the t-bar extends into channel 504.

Mechanism 500 includes components that, when actuated, prevent an ejection mechanism from operating to eject a notebook computer from a docking station. Mechanism 500 includes lever arm 512. Lever arm 512 is attached to side 506 in channel 504 at a circular portion 513 of lever arm 512. Lever arm 512 pivots around point 514 under the influence of a t-bar lock as described in more detail below. Lever arm 512 also includes an actuating member 516 that extends in a generally radial direction away from circular portion 513 of lever arm 512.

Mechanism 500 also includes a sliding member 518. Sliding member 518 includes an angled surface 520 that engages actuating member 516 of lever arm 512. Sliding member 518 is positioned in channel 504 of bracket 502.

Sliding member 518 is biased into contact with actuating member 516 of lever arm 512. Mechanism 500 includes spring 522. At one end, spring 522 is attached to side 508 of bracket 502. At the other end, spring 522 is attached to a portion of sliding member 518 that extends through channel 524 in bracket 502.

Figure 6:
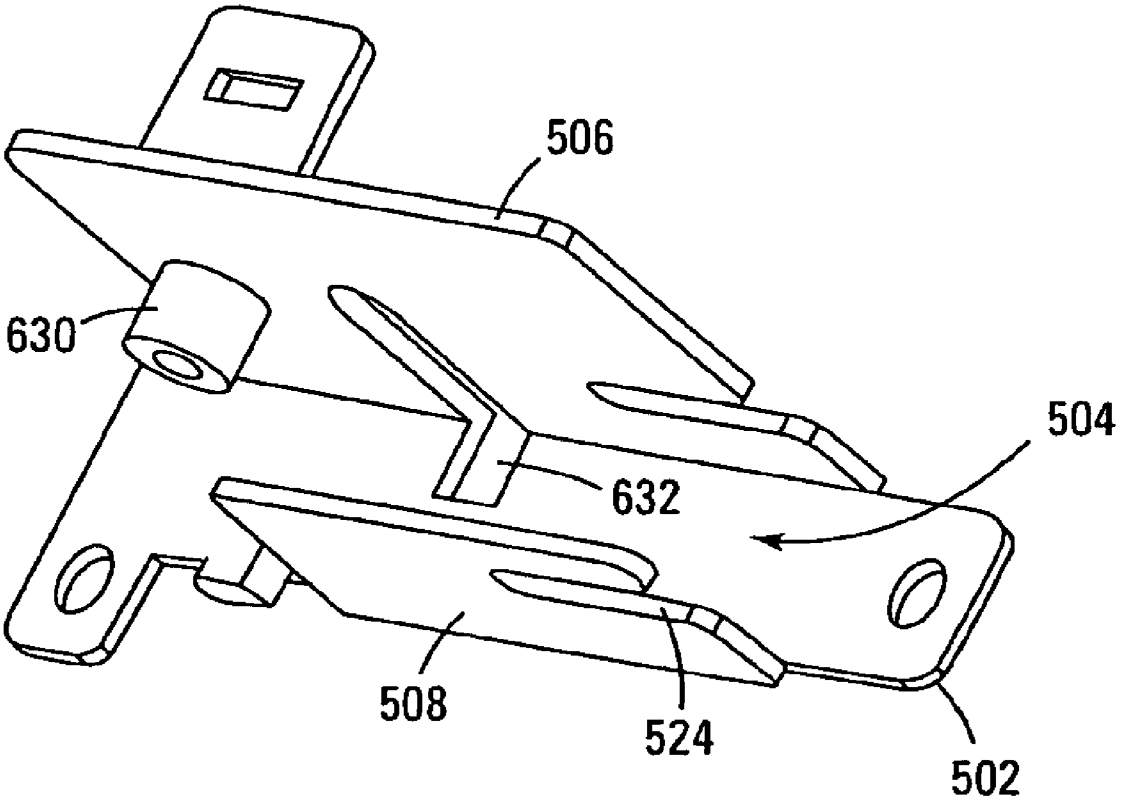
FIG. 6 is another perspective view of an embodiment of a bracket of the security mechanism of FIG. 5.

FIG. 6 is another perspective view of bracket 502 of the mechanism 500 of FIG. 5. In FIG. 6, lever arm 512, sliding member 518, and spring 522 have been removed to reveal additional aspects of bracket 502. As shown, bracket 502 also includes a cylindrical member 630 extending into channel 504 for receiving lever arm 512. Further, bracket 502 also includes opening 632 in a bottom surface of channel 504 that receives the t-bar of a lock. Opening 632 is sized to enable the t-bar of a t-bar lock to pass through opening 632 when in an unlocked position and to inhibit the t-bar from passing through when the lock is in a locked position.

Figure 7:
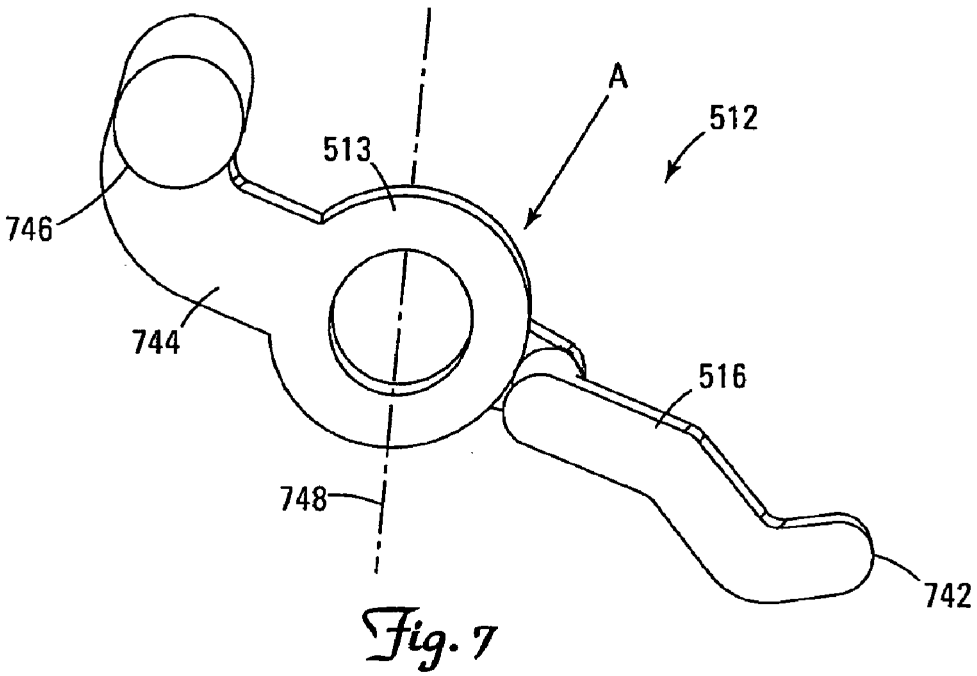
FIG. 7 is a perspective view of an embodiment of a lever arm used in the security mechanism of FIG. 5.

FIG. 7 is a perspective view of an embodiment of lever arm 512 used in the mechanism of FIG. 5. Lever arm 512 includes actuating member 516. Actuating member 516 has a surface 742 at a distal end of actuating member 516. Surface 742 engages angled surface 520 of sliding member 518. Lever arm 512 forms an axis 748 at the center of circular portion 513. Lever arm 512 rotates about axis 748 when actuated. Lever arm 512 also includes a surface 743 that engages the t-bar of a t-bar lock to control the rotation of lever arm 512 about axis 748.

In one embodiment, lever arm 512 also includes a second actuating member 744 that is used to actuate a lock-out mechanism for preventing a drive or other removable device from being removed from a docking station. The operation of the mechanism for securing a removable device is described in more detail below with respect to FIGS. 11–15. Second actuating member 744 includes surface 746 that engages the mechanism for locking out removal of the removable devices.

Figure 8:
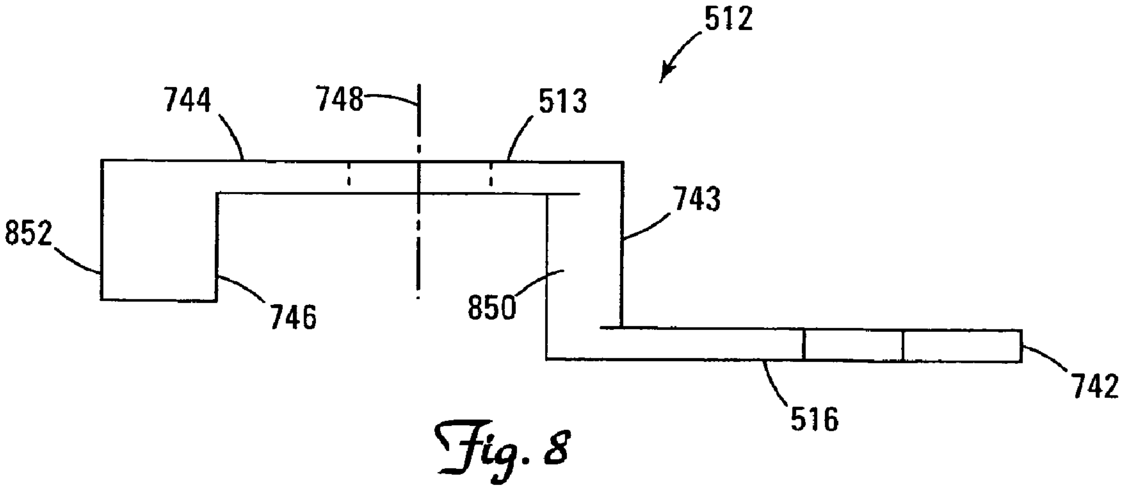
FIG. 8 is a top view of an embodiment of the lever arm of FIG. 7.

FIG. 8 is a top view of an embodiment of the lever arm 512 taken in the direction of arrow A in FIG. 7. This illustration shows the relative displacement of various elements of the lever arm 512 with respect to circular portion 513. As shown here, first actuating member 516 is offset laterally from circular portion 513 and second actuating member 744 by member 850. Similarly, a portion 852 of second actuating member 744 extends laterally with respect to the location of circular portion 513 of lever arm 512.

Figure 9:
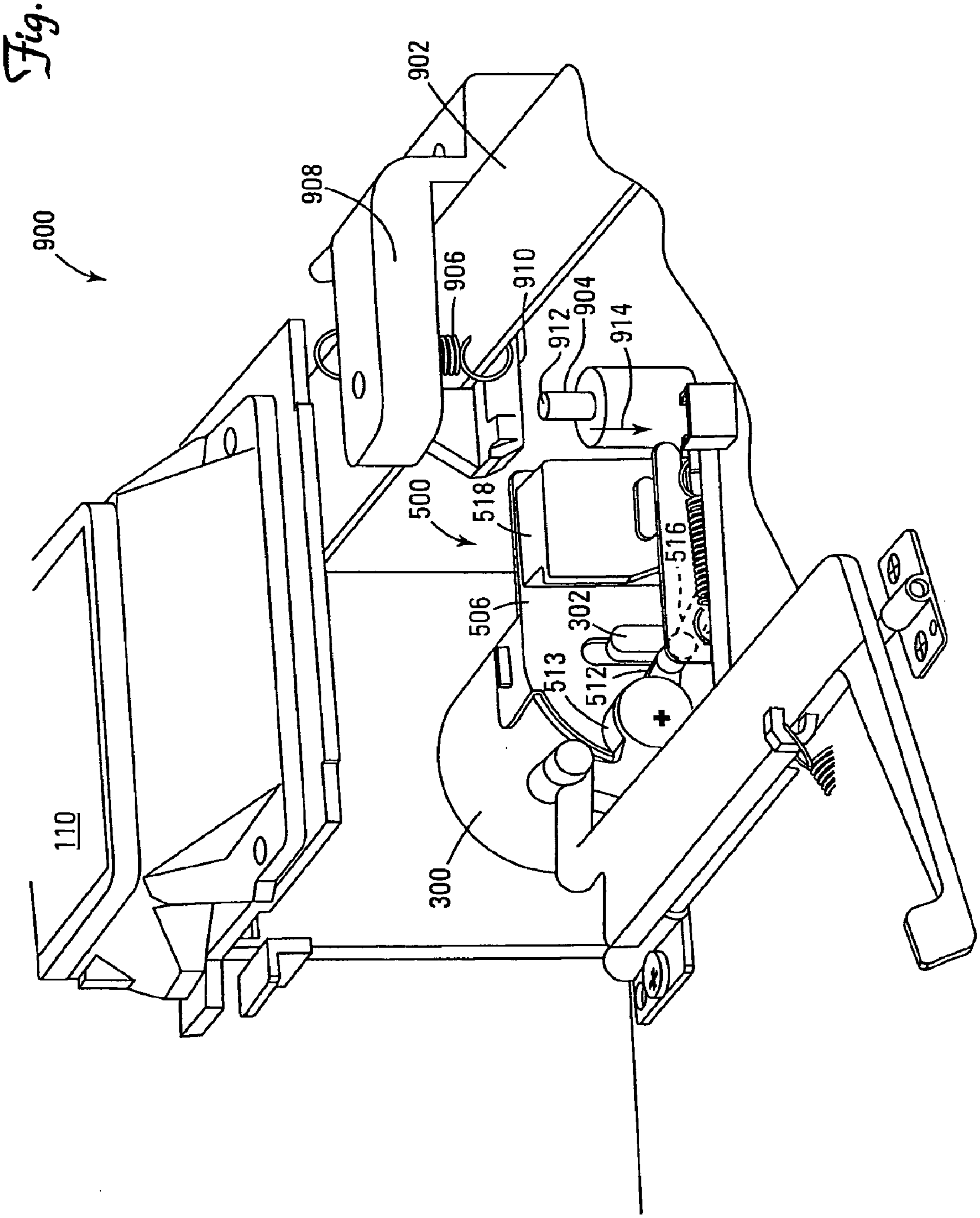
FIG. 9 is a perspective view of an internal portion of an embodiment of a docking station with a security mechanism for preventing ejection of a notebook computer from the docking station with the security mechanism in an unlocked position.

FIG. 9 is a perspective view of an embodiment of an internal portion of a docking station 900 with a security mechanism 500 in an unlocked position for preventing ejection of a notebook computer from the docking station 900.

Docking station 900 includes an ejection mechanism that enables a notebook computer to be released from the docking station. Only a portion of the ejection mechanism is shown in FIG. 9 for simplicity. Specifically, the ejection mechanism includes ejection button 110 that is exposed on a surface of docking station 900. Ejection button 110 is operatively coupled to eject member 902. Eject member 902 moves down toward internal ejection button 904 when ejection button 110 is pressed. Eject member 902 is biased above internal ejection button 904 by spring 906 such that eject member 902 does not engage internal ejection button 904 except when ejection button 110 is pressed. One end of spring 906 is coupled to eject member 902 and the other end of spring 906 is coupled to stationary bracket 908.

When ejection button 110 is pressed, eject member 902 descends toward internal ejection button 904 until surface 910 engages surface 912 of internal ejection button 904 and moves button 904 down in the direction of arrow 914. This actuates the ejection mechanism to release the notebook computer. As shown in FIG. 9, the security mechanism 500 is disengaged and thus the notebook computer can be freely ejected.

Figure 10:
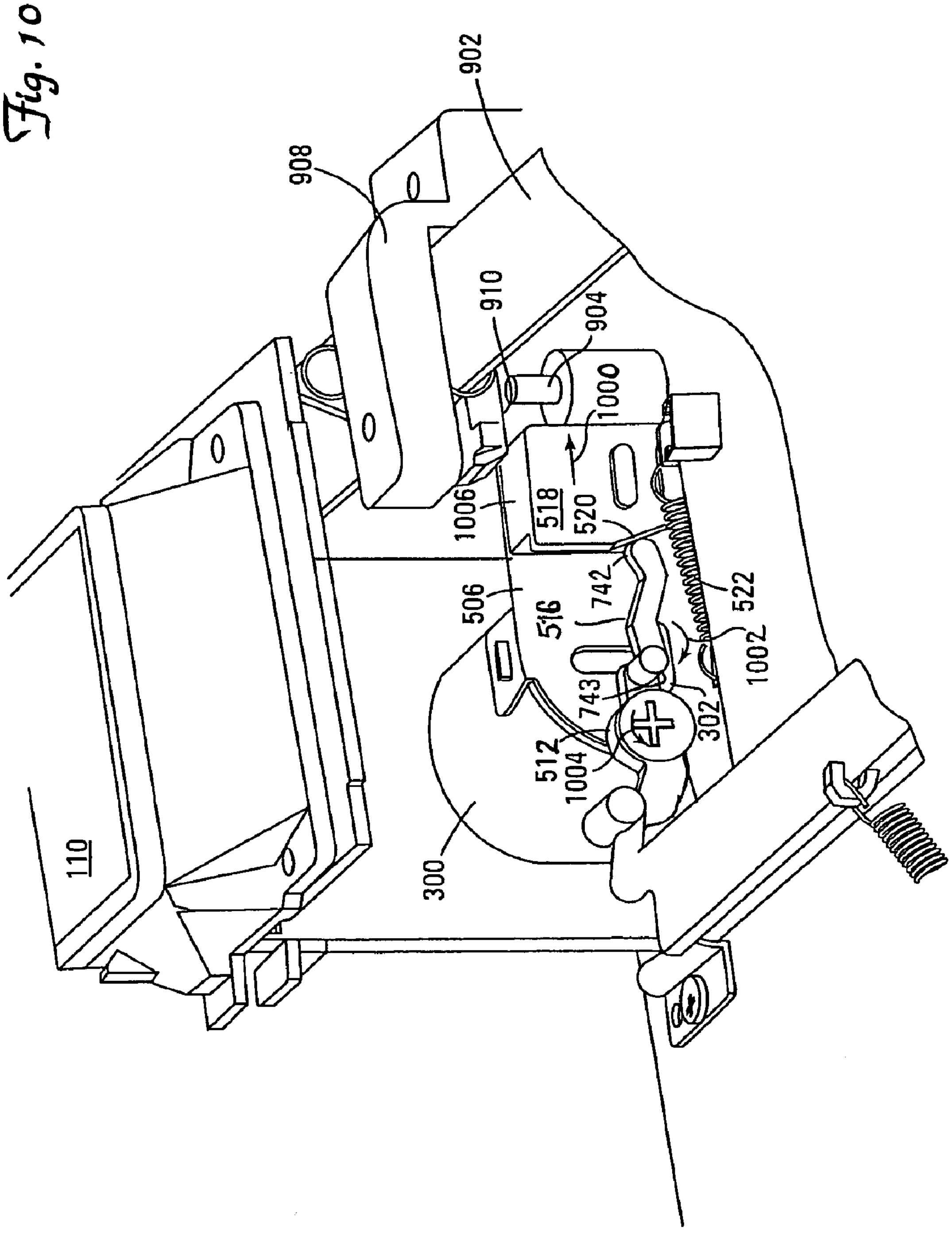
FIG. 10 is a perspective view of the internal portion of the docking station of the embodiment of FIG. 9 with the security mechanism in a locked position.

FIG. 10 is a perspective view of the internal portion of the docking station 900 of the embodiment of FIG. 9 with the security mechanism 500 in a locked position. When lock 300 is placed in a locked position, t-bar 302 rotates in the direction of arrow 1002. This engages surface 743 of lever arm 512. When engaged, surface 743 forces lever arm 512 to rotate in the direction of arrow 1004. The distal end 742 of lever arm 512 engages angled surface 520 of sliding member 518. As lever arm 512 rotates, sliding member 518 is forced to move in the direction of arrow 1000 in opposition to the force of spring 522. When in the fully locked position, actuating member 516 forces sliding member 518 into a position such that surface 910 of eject member 902 engages top 1006 of sliding member 518 before reaching internal ejection button 904. Thus, when locked, a notebook computer cannot be ejected from docking station 900 because sliding member 518 prevents eject member 902 from reaching and actuating internal ejection button 904. Thereby, the lock 300 secures both the docking station 900 to an object and the notebook computer to the docking station 900 with a common security mechanism.

IV. Securing a Removable Device

FIGS. 11–15 illustrate one embodiment of an internal mechanism for a docking station that inhibits operation of an ejection mechanism for ejecting a removable device when a security mechanism is locked. Each of FIGS. 11–15 is described in turn below. For convenience in describing this embodiment, common components between the various figures are illustrated with the same reference numerals.

Figure 11:
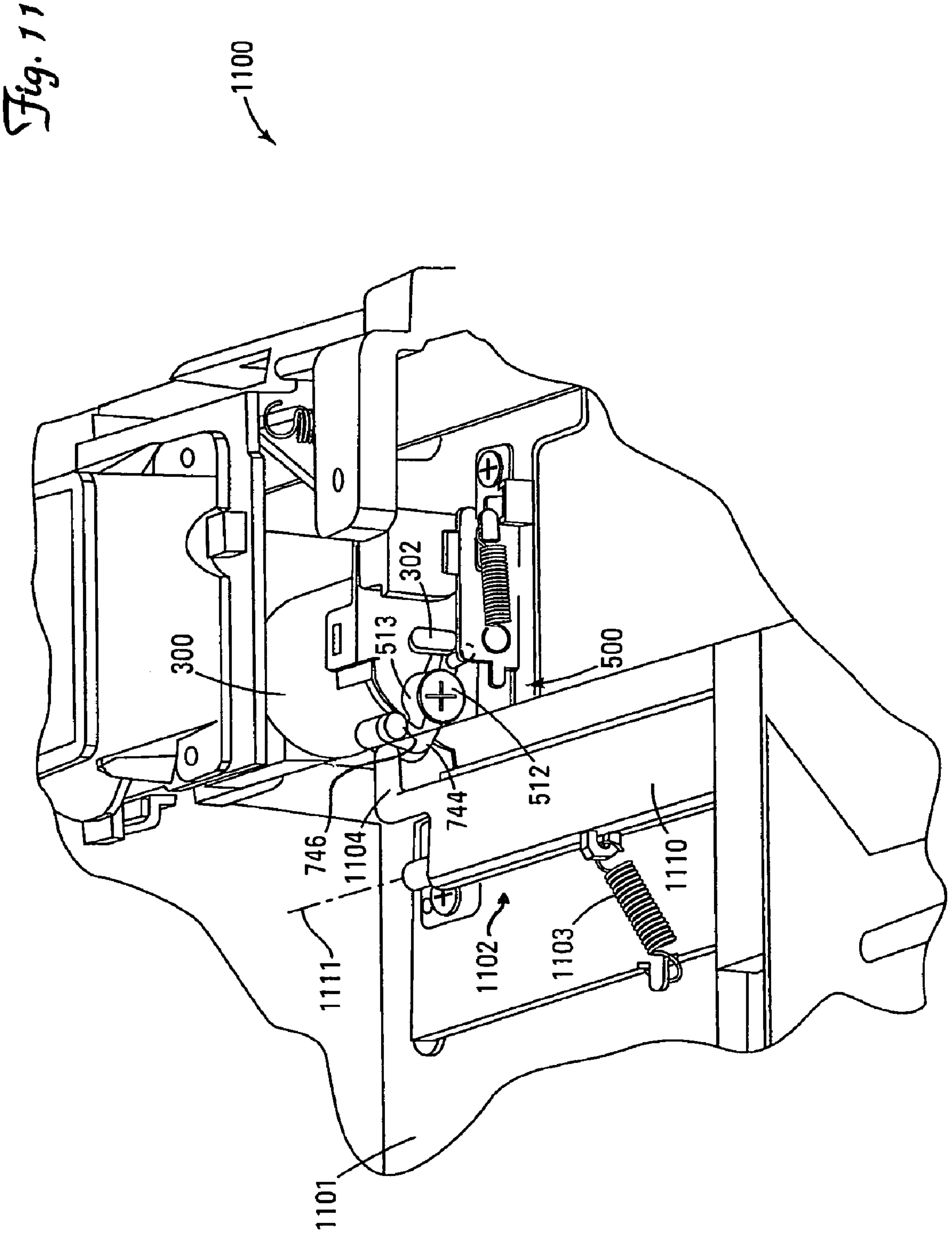
FIGS. 11 and 12 are perspective views of an internal portion of an embodiment of a docking station with a security mechanism for preventing the ejection of a removable device from the docking station with the security mechanism in an unlocked position.
Figure 12:
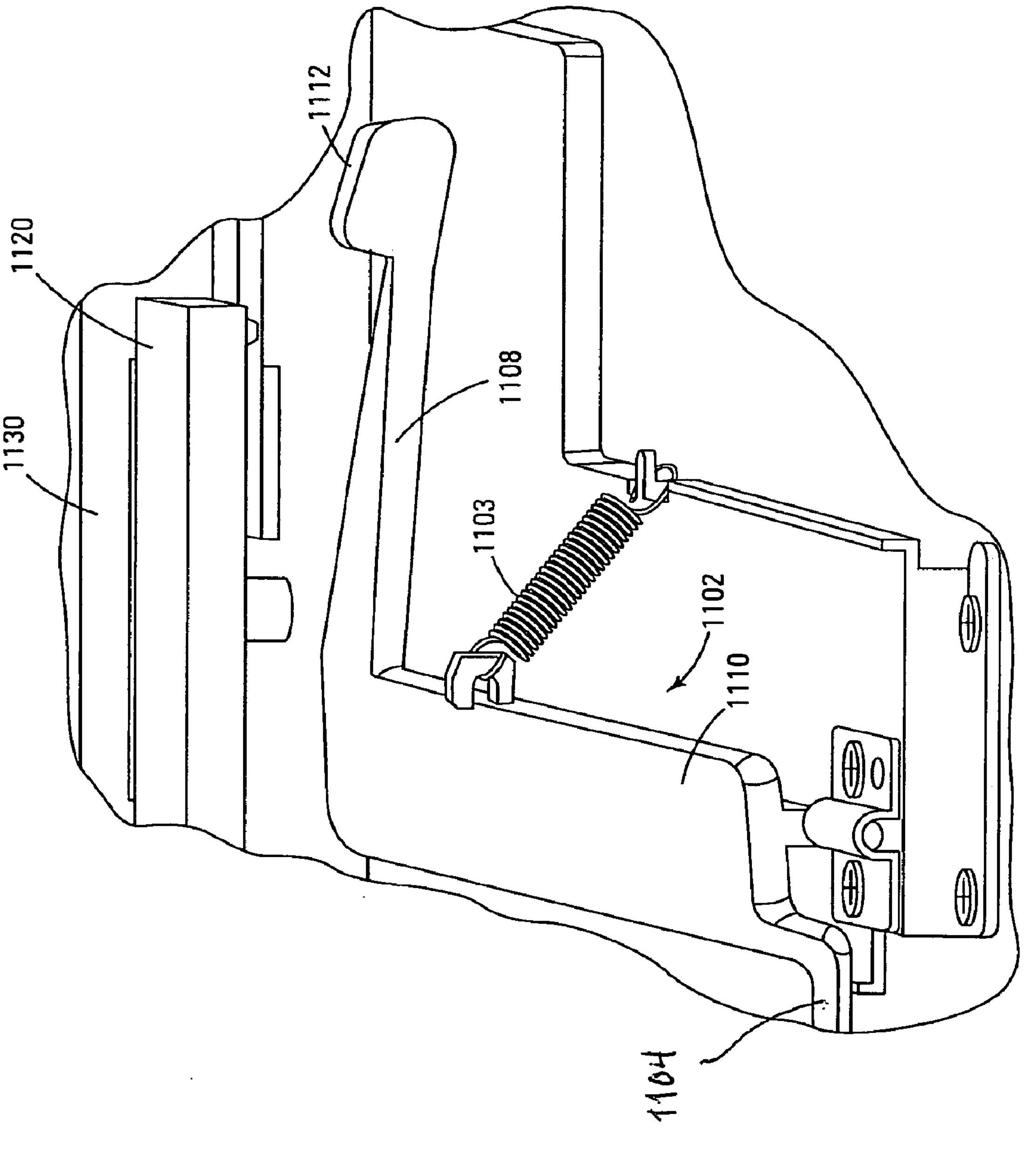

FIGS. 11 and 12 are perspective views of an internal portion of an embodiment of a docking station 1100 with a security mechanism 500 for preventing the ejection of a removable device 1130 from the docking station 1100 with the security mechanism 500 in an unlocked position. Security mechanism 500 engages and controls the operation of lock arm 1102 to prevent the ejection of the removable device 1130 from connector 1120. In one embodiment, connector 1120 includes an ejection mechanism that releases removable device when removable device 1130 is pushed toward connector 1120. Lock arm 1102 includes a transverse portion 1110 that is pivotally coupled to base 1101 of docking station 1100. Transverse portion 1110 is biased in position by spring 1103 coupled between transverse portion 1110 and base 1101. Transverse portion 1110 rotates about axis 1111.

Lock arm 1102 engages lever arm 512. Lock arm 1102 includes member 1104 that engages surface 746 of second actuating member 744 of lever arm 512. When in the unlocked position, spring 1103 biases member 1104 up into contact with surface 746 as shown.

As shown in FIG. 12, a second member 1108 is disposed at an end of lock arm 1102 opposite the member 1104. Second member 1108 includes an interfering surface 1112 that prevents removal of the removable devices from docking station 1100. When lock 300 is in the unlocked position, interfering surface 1112 of lock arm 1102 is stowed in a lowered position under the force of spring 1103 such that it does not interfere with the normal operation of the ejection mechanism for the removable device 1130.

Figure 13:
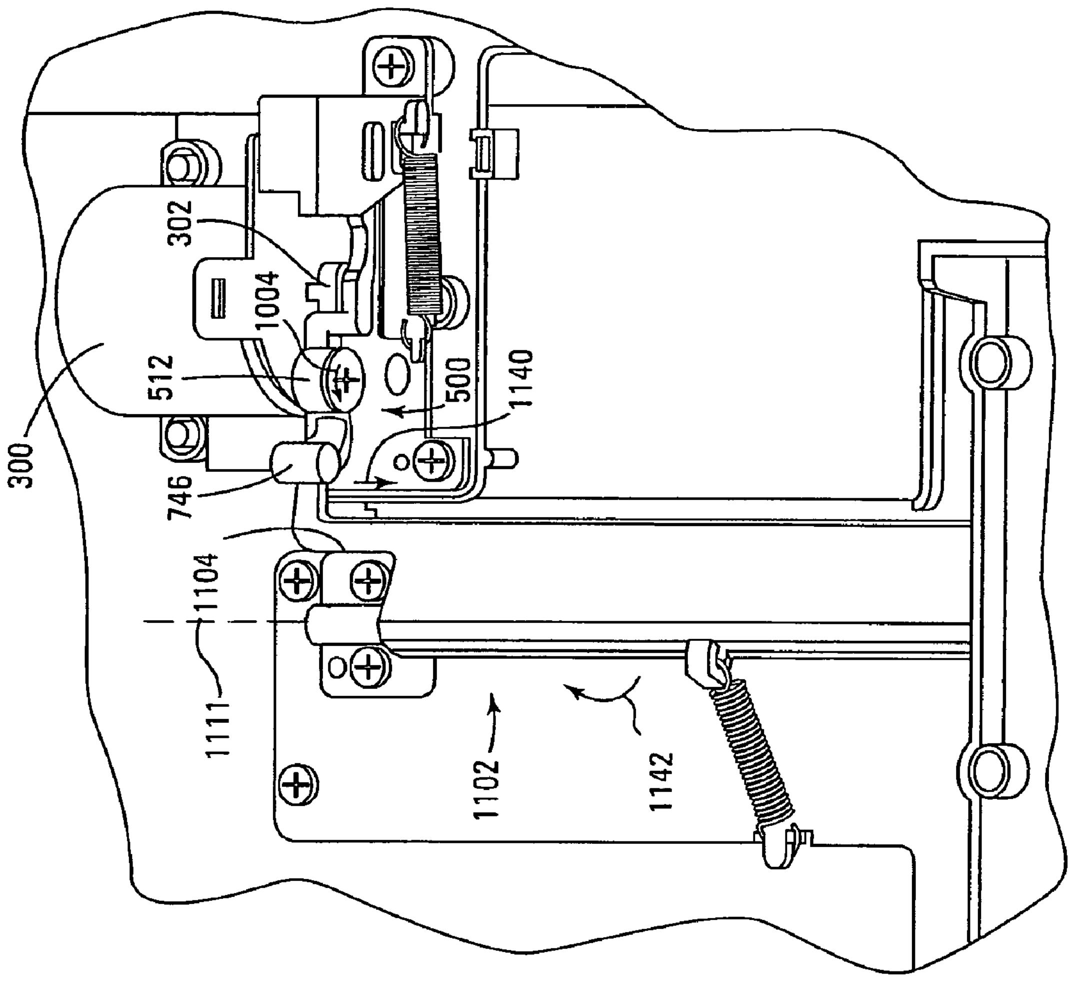
FIGS. 13 and 14 are perspective views of the internal portion of the docking station of the embodiment of FIGS. 11 and 12 with the security mechanism in a locked position.
Figure 14:
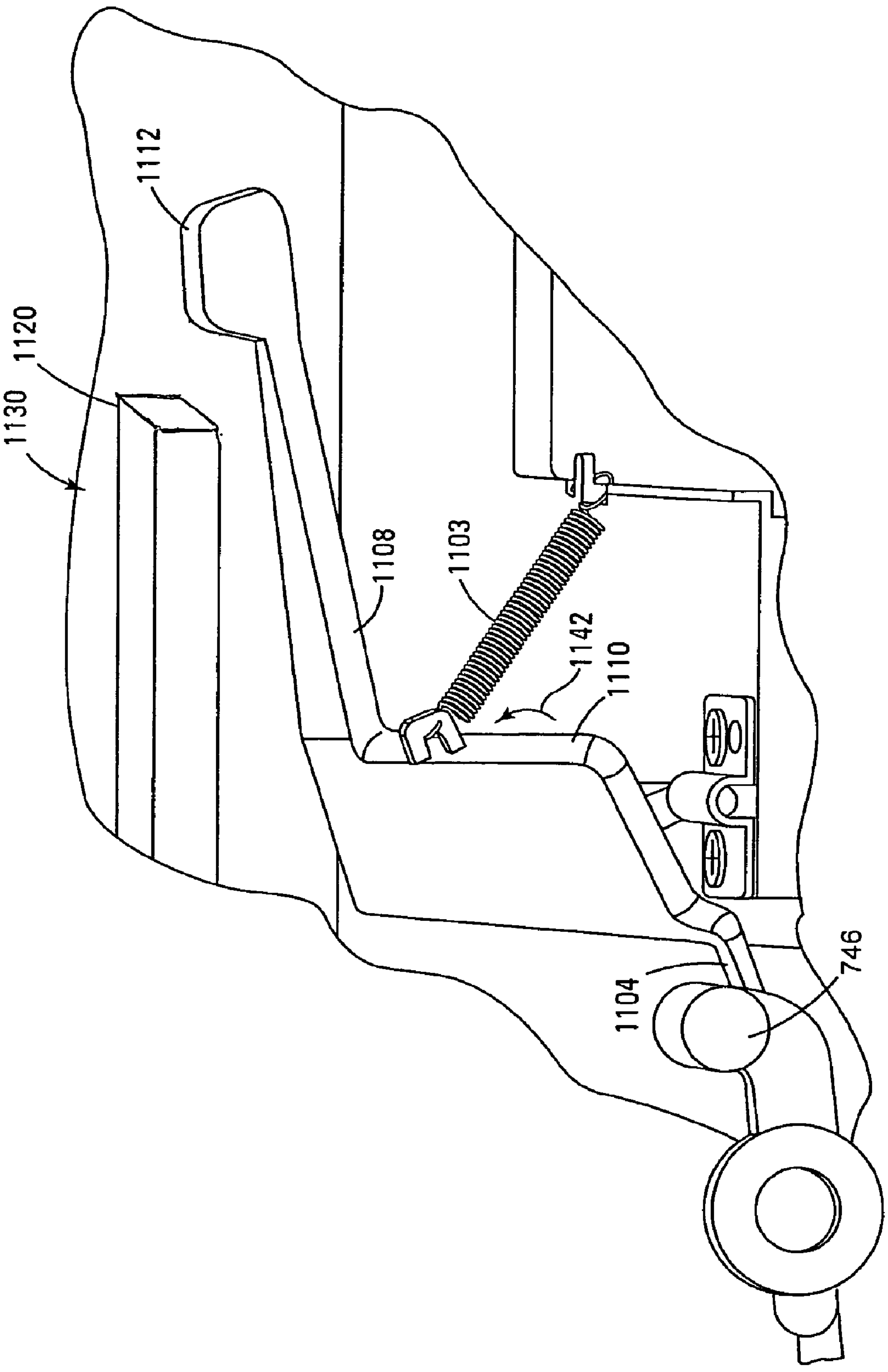

When the lock 300 moves to a locked position, interfering surface 1112 is moved into a position to prevent the removal of the removable device 1130. This is illustrated in FIGS. 13 and 14. When lock 300 is locked, t-bar 302 of lock 300 rotates into the locked position. As described above, in the locked position, lever arm 512 rotates in the direction of arrow 1004. This forces the member 1104 down in the direction of arrow 1140. In response, transverse portion 1110 of lock arm 1102 rotates up about axis 1111 in the direction of arrow 1142 against the force of spring 1103.

As shown in FIG. 14, transverse portion 1110 of lock arm 1102 rotates in the direction of arrow 1142 such that member 1108 and interfering surface 1112 move up to interfere with the operation of the ejection mechanism in connector 1120 for the removable device 1130.

Figure 15:
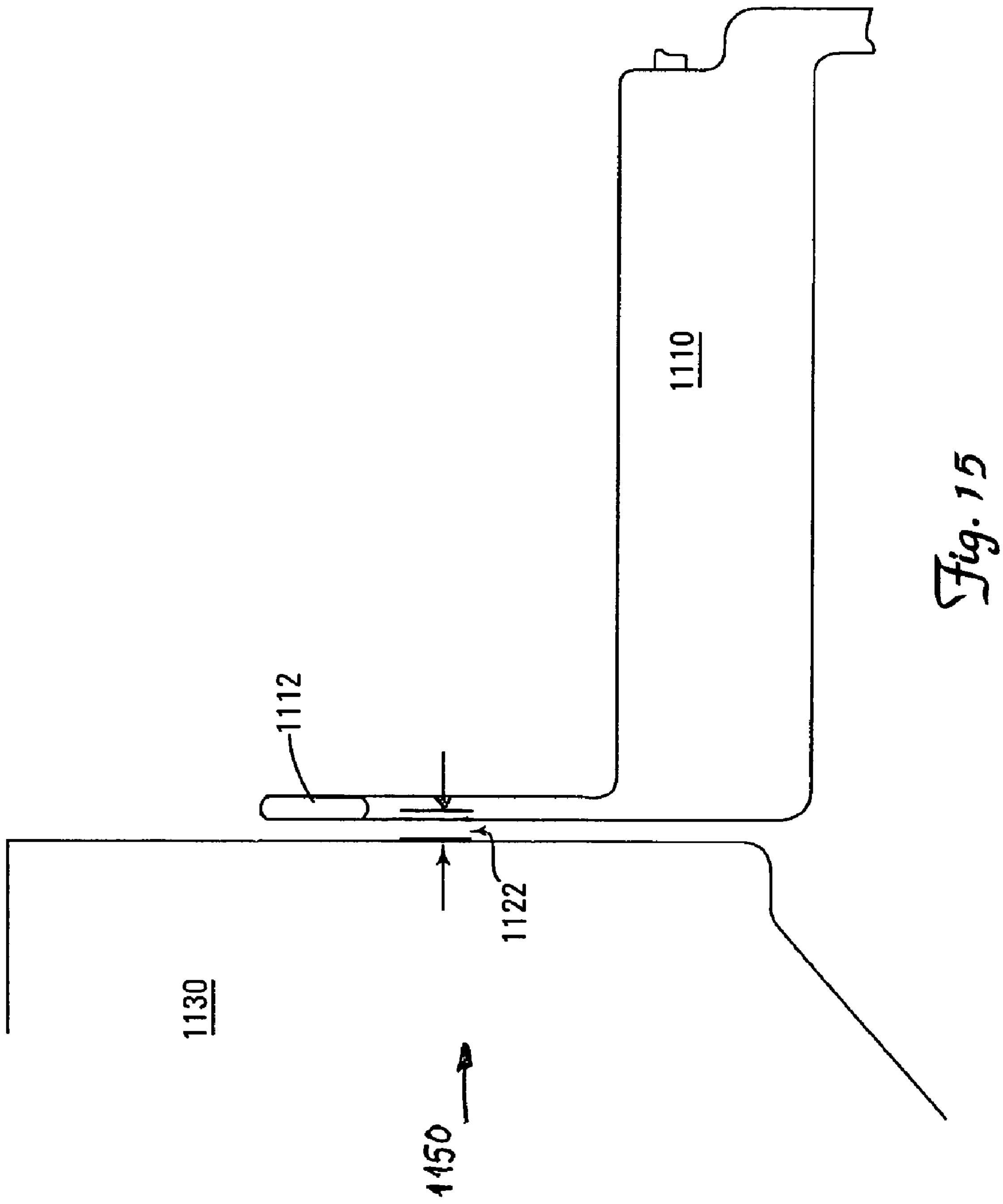
FIG. 15 is a top view of the internal portion of the docking station of the embodiment of FIGS. 11 and 12 with the security mechanism in a locked position.
Figure 16:
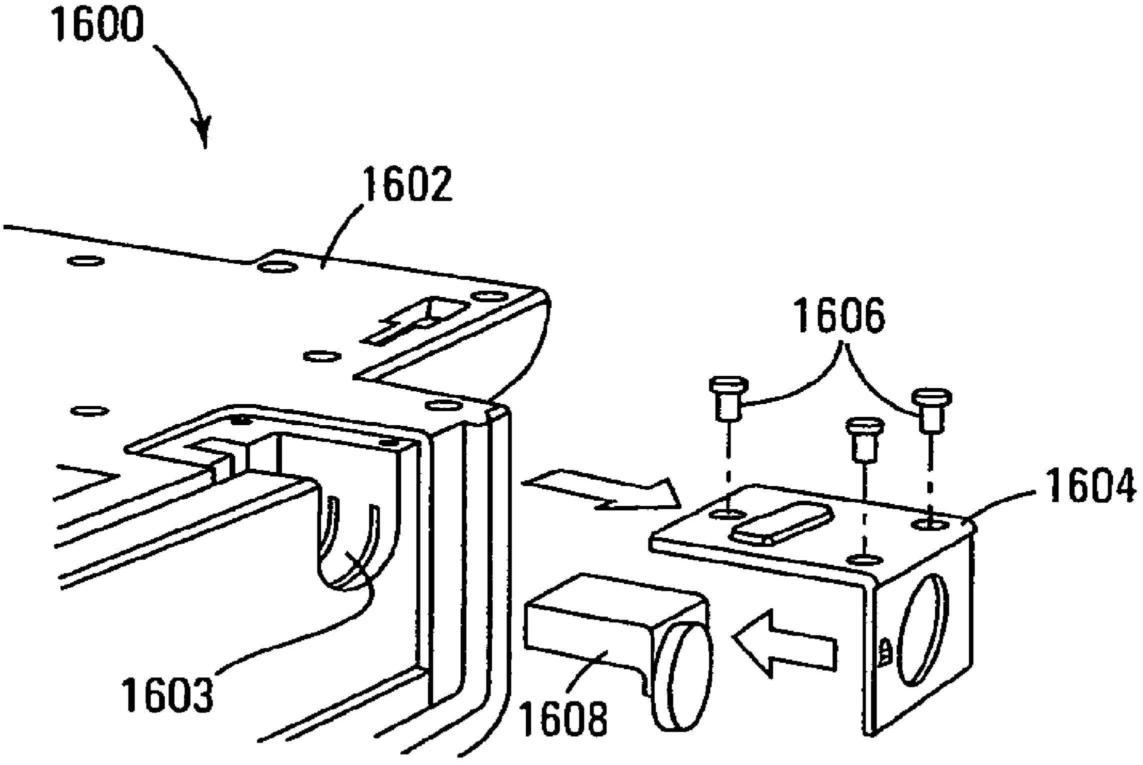
FIGS. 16, 17, 18, and 19 are perspective views of a docking station showing one embodiment of a technique for adding a lock mechanism to the docking station.

FIG. 15 is a top view of the internal security mechanism 500 of FIG. 11 in a locked position. In this view, the interfering surface 1112 is shown interfering with the movement of removable device 1130. To eject removable device 1130, the removable device 1130 is pressed in the direction of arrow 1150 a distance indicated at 1122. When the interfering member 1112 rotates into the locked position, the interfering member 1112 prevents the removable device 1130 from moving the required distance and thus the ejection mechanism of connector 1120 is prevented form releasing the removable device 1130.

V. Installing a Lock in a Docking Station

FIGS. 16–19 are perspective views of a docking station 1600 showing one embodiment of a technique for adding a lock to the docking station 1600. Beginning in FIG. 16, the docking station 1600 is shown in an inverted position with the bottom 1602 of docking station 1600 exposed. To insert the lock, cover 1604 is removed thereby exposing a slot 1603 for receiving the lock. In one embodiment, cover 1604 is secured in place on docking station 1600 with screws 1606. In other embodiments, cover 1604 is fastened to docking station 1600 using any appropriate removable fastening device. In one embodiment, a blank 1608 is provided to fill slot 1603 when a lock is not installed. Thus, prior to installation of the lock, the blank 1608 is removed from slot 1603.

Figure 17:
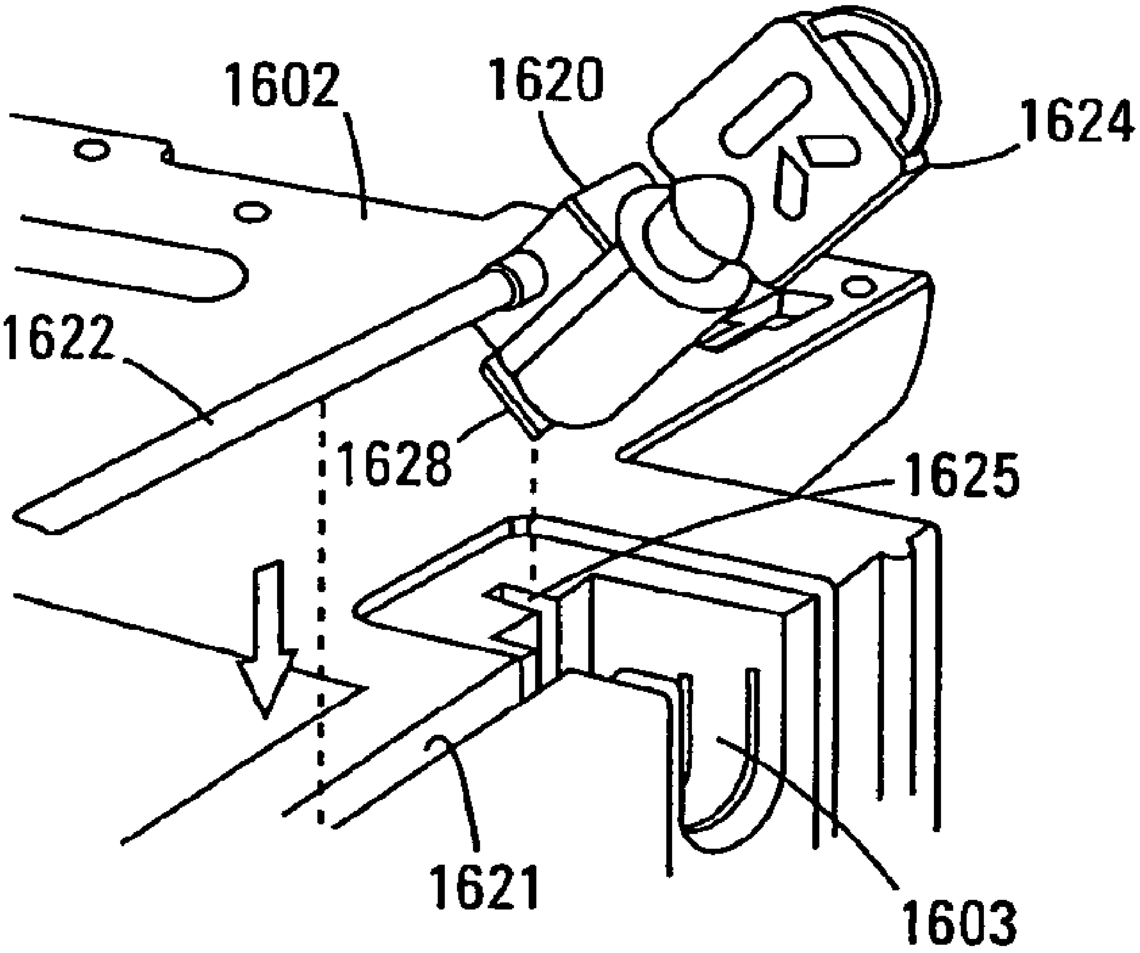

FIG. 17 illustrates the placement of the lock in slot 1603. In one embodiment, the lock comprises a t-bar lock 1620 with a cable 1622 extending from the body of the t-bar lock. The t-bar lock 1620 is placed in slot 1603 with the t-bar lock 1620 in the unlocked position. In this position, the t-bar 1628 is in a vertical position and slides into slot 1625 at an end of slot 1603. Further, cable 1622 is placed into channel 1621 on bottom 1602 of docking station 1600. Once in place, t-bar lock 1620 rests entirely within the slot 1603.

Figure 18:
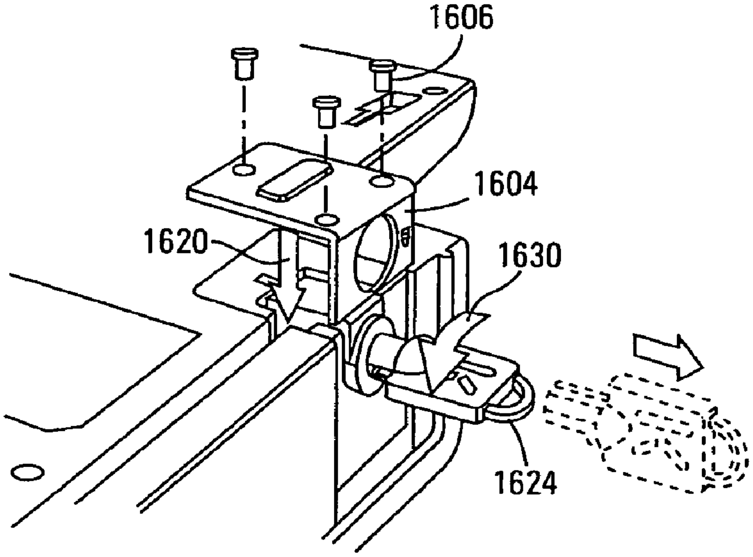
Figure 19:
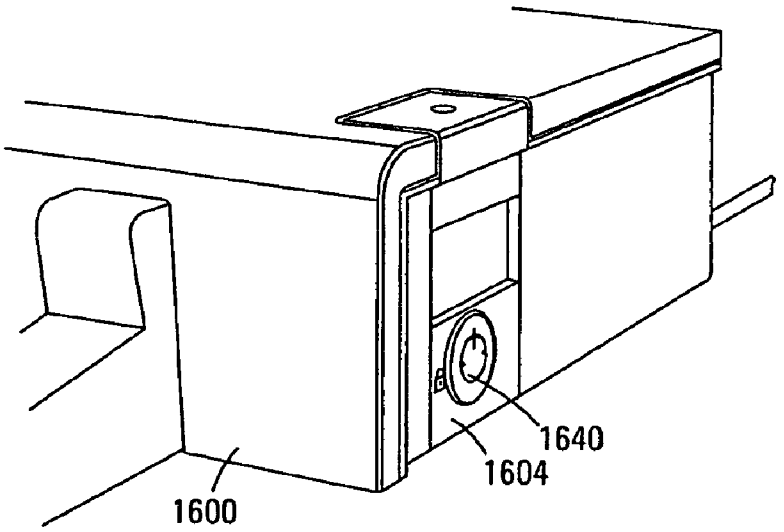

FIG. 18 illustrates the completion of the installation process. The key 1624 is rotated in a direction indicated by arrow 1630 to rotate t-bar 1628 and lock t-bar lock 1620 in place in slot 1603 of docking station 1600. Once locked, the key 1624 is removed. The cover 1604 is placed over the t-bar lock 1620 and secured in place with screws 1606. As shown in FIG. 19, key receptacle 1640 of lock 1620 is exposed in an opening of cover 1604 on a side of docking station 1600 once the lock is in place and the docking station 1600 is turned over and situated for operation.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A docking station, comprising:

a base unit for engaging a computer;

a lock, secured in the base unit, the lock including a body housing a lock mechanism, a key receptacle exposed in an opening on a side of the base unit, and a t-bar extending from the body;

an ejection mechanism on the base unit;

an eject member responsive to the ejection mechanism to release the computer from the base unit;

a lever arm having a first surface for engaging the t-bar of the lock, the lever arm rotating when the t-bar moves between a locked position and an unlocked position; and a sliding member, responsive to movement of the lever arm, that slides into a position to interfere with the eject member when the lock is in a locked position such that the ejection mechanism is disabled from releasing the computer from the base unit.

2. The docking station of claim 1, wherein the lock includes a cable that is adapted to secure the lock to an object.

3. The docking station of claim 2, wherein the base unit includes a channel on a bottom of the base unit to receive the cable.

4. The docking station of claim 1, and further including a bracket having a channel for receiving and guiding the sliding member, wherein the lock fits between a surface of the base unit and the bracket and wherein the lever arm is attached to a surface of the bracket.

5. The docking station of claim 4, wherein the bracket includes an opening adapted to enable the t-bar of the lock to pass through when the lock is in an unlocked position and to inhibit the t-bar from passing through when the lock is in a locked position.

6. The docking station of claim 1, and further including a spring for biasing the sliding member in contact with the lever arm.

7. The docking station of claim 1, wherein the sliding member has an angled surface that engages the lever arm.

8. The docking station of claim 1, wherein the lever arm includes:

a circular portion that defines an axis about which the lever arm rotates, an actuating member extending from the circular portion, and the actuating member having a distal end that engages the sliding member.

9. The docking station of claim 1, wherein the base unit further includes a removable panel that enables removal and insertion of the lock in the base unit.

10. A docking station, comprising:

a base unit for engaging a computer;

a lock in the base unit and including a body housing a lock mechanism, a key receptacle exposed in an opening on a side of the base unit, and a t-bar extending from the body;

a first ejection mechanism at a surface of the base unit;

an eject member responsive to movement of the first ejection mechanism to release the computer from the base unit;

a slot in the base unit for receiving a removable device;

a second ejection mechanism, associated with the slot, to release the removable device when the second ejection mechanism is activated;

a lever arm having a first surface for engaging the t-bar of the lock, the lever arm rotating when the t-bar moves between a locked position and an unlocked position;

a sliding member, responsive to movement of the lever arm, that slides into a position to interfere with the eject member when the lock is in a locked position such that the first ejection mechanism is disabled from releasing the computer from the base unit; and a lock arm, responsive to the movement of the lever arm, that rotates to a position to interfere with the second ejection mechanism when the lock is in a locked position such that the second ejection mechanism is disabled from releasing the removable device.

11. The docking station of claim 10, wherein the lock arm includes an interfering surface that rotates to a position to interfere with the second ejection mechanism.

12. The docking station of claim 10, and further including a channel for receiving and guiding the sliding member.

13. The docking station of claim 10, and further including a first assembly for holding the sliding member in contact with the lever arm and a second assembly for holding the lock arm in contact with the lever arm.

14. The docking station of claim 10, wherein the lever arm includes first and second actuating members, the first actuating member for positioning the sliding member and the second actuating member for rotating the the lock arm.

15. A docking station, comprising:

a base unit for engaging a computer;

a lock, secured in the base unit, the lock including a body housing a lock mechanism, a key receptacle exposed in an opening on a side of the base unit, and a t-bar extending from the body;

a slot in the base unit for receiving a removable device;

an ejection mechanism, associated with the slot, to release the removable device when the ejection mechanism is activated;

a lever arm having a first surface for engaging the t-bar of the lock, the lever arm rotating when the t-bar moves between a locked position and an unlocked position; and a lock arm, responsive to the movement of the lever arm, the lock arm including an interfering surface that rotates to a position to interfere with the ejection mechanism when the lock is in a locked position such that the ejection mechanism is disabled from releasing the removable device.

16. The docking station of claim 15, and further including a bracket, wherein the lock fits between a surface of the base unit and the bracket and wherein the lever arm is attached to a surface of the bracket.

17. The docking station of claim 16, wherein the bracket includes an opening adapted to enable the t-bar of the lock to pass through when the lock is in an unlocked position and to inhibit the t-bar from passing through when the lock is in a locked position.

18. The docking station of claim 15, wherein the lever arm includes:

a circular portion that defines an axis about which the lever arm rotates, and an actuating member having a distal end that engages the lock arm.

19. The docking station of claim 15, wherein the lock arm includes:

a first member that engages the lever arm;

a transverse member having first and second opposite ends, the first end coupled to the first member; and a second member coupled to the second end of the transverse member, the second member including the interfering surface.

20. The docking station of claim 19, wherein the first member of the lock arm rotates the transverse member around an axis of the transverse member when the t-bar of the lock moves between a locked position and an unlocked position.

21. A docking station, comprising:

a base unit for engaging a computer;

a lock, secured in the base unit, the lock including:

a body housing a lock mechanism, a key receptacle, located on a first side of the body and exposed in an opening on a side of the base unit, and a t-bar extending from a second, opposite side of the body, a cable extending from the body through a second opening in the base unit, the cable for coupling to an object for securing the base unit to the object;

an ejection mechanism, including:

a button exposed at a surface of the base unit, an internal ejection button, and an eject member responsive to movement of the button to actuate the internal ejection button to release the computer from the base unit;

a lever arm having a first surface for engaging the t-bar of the lock, the lever arm rotating when the t-bar moves between a locked position and an unlocked position; and a sliding member, responsive to movement of the lever arm, that slides into a position to interfere with the eject member of the eject mechanism when the lock is in a locked position such that the ejection mechanism is disabled from releasing the computer from the base unit.

22. A method comprising:

removing a cover from a base unit of a computer docking station to expose a slot for receiving a lock;

inserting a t-bar of the lock in an opening of a bracket that abuts the slot;

securing the lock in the slot;

replacing the cover on the base unit;

coupling a computer to the docking station;

inserting a key into the lock; and rotating the key such that the t-bar of the lock forces a lever in the base unit to rotate and move a sliding member into a position to disable operation of an ejection button of the docking station to prevent removal of a computer from the docking station.

23. A docking station, comprising:

a base unit for engaging a computer;

a lock including a lock mechanism, a key receptacle exposed in an opening on a side of the base unit, and a t-bar extending from the lock mechanism;

an ejection mechanism on the base unit;

a lever arm having a first surface for engaging the t-bar of the lock, the lever arm rotating when the t-bar moves between a locked position and an unlocked position; and a sliding member, responsive to movement of the lever arm, that slides into a position to interfere with the ejection mechanism when the lock is in a locked position such that the ejection mechanism is disabled from releasing the computer from the base unit.

* * * * *

UNITED STATES PATENT AND TRADEMARK OFFICE

CERTIFICATE OF CORRECTION

PATENT NO. : 7,227,747 B2

APPLICATION NO. : 10/969035

DATED : June 5, 2007

INVENTOR(S) : Paul Walker et al.

It is certified that error appears in the above-identified patent and that said Letters Patent is hereby corrected as shown below:

In column 3, line 48, delete “connector 16” and insert -- connector 116 --, therefor.

In column 4, line 16, delete “button 10” and insert -- button 110 --, therefor.

In column 10, line 49, in Claim 14, delete “the” before “lock arm”.

Signed and Sealed this

Twenty-third Day of September, 2008

JON W. DUDAS

*Director of the United States Patent and Trademark Office*